United States Patent
Rice et al.

(10) Patent No.: US 6,478,260 B1
(45) Date of Patent: Nov. 12, 2002

(54) STAR DETECTION AND LOCATION SYSTEM

(75) Inventors: Christopher L. Rice, North Lawndale, CA (US); Yeong-Wei A. Wu, Rancho Palos Verdes, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/507,099

(22) Filed: Feb. 17, 2000

(51) Int. Cl.$^7$ ................................. B64G 1/36
(52) U.S. Cl. ..................... 244/171; 250/203.1
(58) Field of Search ............... 244/171, 158 R; 701/222; 250/203.1, 203.6

(56) References Cited

U.S. PATENT DOCUMENTS

| | | | | |
|---|---|---|---|---|
| 3,274,393 A | * | 9/1966 | Zuckerbraun | |
| 3,732,424 A | * | 5/1973 | Wojtulewicz | |
| 4,621,329 A | * | 11/1986 | Jacob | |
| 4,944,587 A | * | 7/1990 | Harigae | |
| 5,410,143 A | * | 4/1995 | Jones | |
| 5,473,746 A | * | 12/1995 | Pritt et al. | |
| 5,745,869 A | * | 4/1998 | van Bezooijen | |
| 6,158,694 A | * | 12/2000 | Gowrinathan | |

* cited by examiner

*Primary Examiner*—Charles T. Jordan
*Assistant Examiner*—Tien Dinh
(74) *Attorney, Agent, or Firm*—Terje Gudmestad

(57) ABSTRACT

An apparatus for determining star location includes a star tracker, a star catalog and a controller. The star tracker is used to sense the positions of stars and generate signals corresponding to the positions of the stars as seen in its field of view. The star catalog contains star location data that is stored using a primary and multiple secondary arrays sorted by both declination (DEC) and right ascension (RA), respectively. The controller checks the star catalog and determines which stars to track. The controller does this determination by using an algorithm to sort the primary and secondary arrays to determine which stars are located in the star tracker field of view. The controller then commands the star tracker to track these stars and uses them to determine the spacecraft attitude.

21 Claims, 2 Drawing Sheets

STAR DETECTION AND LOCATION SYSTEM

STATEMENT OF GOVERNMENT INTEREST

Portions of the invention set forth herein were developed with Government support. As a result, the United States of America as represented by its various departments and agencies may have certain rights in this patent.

TECHINICAL FIELD

The present invention relates generally to star trackers, and more particularly, to a system for determining stars in a star tracker field of view.

BACKGROUND ART

Satellites and other spacecraft are in widespread use for various purposes including scientific research and communications. Many scientific and communications missions, however, cannot be accurately fulfilled without consistently monitoring and controlling the 3-axis attitude of the spacecraft. In many applications, the satellite must be positioned to direct communication signals in particular directions or to receive signals from specifically located sources. Without accurate control over spacecraft 3-axis attitude, the transmission of such signals is hindered and at times impossible.

Many modern spacecraft use star trackers for 3-axis attitude control. The systems for 3-axis attitude determination generally include one or more star trackers and a separate 3-axis orthogonal gyroscope. During normal operation, star trackers provide continuous attitude information and the 3-axis orthogonal gyroscope is needed to provide rate information and is constantly corrected by the star trackers.

To improve spacecraft attitude control performance, determining stars in a star tracker field of view (FOV) algorithms employ a carefully designed star catalog. The current known art in star selection for star trackers mainly concentrates on generating star catalogs with certain properties. Typically, one method of locating stars in a tracker FOV uses a standard binary search that is sorted by declination only. This method is not very efficient because it involves searching through hundreds of stars to find the stars that are located within the FOV.

Various other methods use multiple overlapping sub-catalogs that contain stars for a specific FOV in the sky. At any point in time, a star tracker's FOV will reside in one or more of these sub-catalogs. Each star that is in a FOV sub-catalog is tested to determine whether it is in the tracker FOV.

These types of methods require large amounts of memory storage and throughput.

The disadvantages associated with these conventional star determination techniques have made it apparent that a new technique for determining stars within or near a star tracker field is needed. Preferably, the new technique would be able to accurately locate stars within a tracker FOV without requiring large amounts of memory storage and throughput. The new technique should also not require searching through hundreds of stars to find the stars that are located within the FOV.

SUMMARY OF THE INVENTION

It is, therefore, an object of the invention to provide an improved and reliable system for determining stars in a star tracker field of view. Another object of the invention is to provide a system that does not require large amounts of memory storage and throughput.

In one embodiment of the invention, an apparatus for determining star location includes a star tracker, a star catalog and a controller. The star tracker is used to sense the positions of stars and generate signals corresponding to the positions of the stars as seen in its field of view. The star catalog contains star location data that is stored using primary and multiple secondary arrays sorted by both declination (DEC) and right ascension (RA). The controller checks the star catalog and determines which stars to track. The controller does this determination by using an algorithm to sort the primary and secondary arrays to determine which stars are located in the star tracker field of view. The controller then commands the star tracker to track these stars and uses them to determine the spacecraft attitude.

The present invention achieves an improved system for determining stars in a star tracker field of view. The present invention is advantageous in that it does not require searching through hundreds of stars to find the stars that are located within the FOV.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which.

BEST MODES FOR CARRYING OUT THE INVENTION

Figure 1:
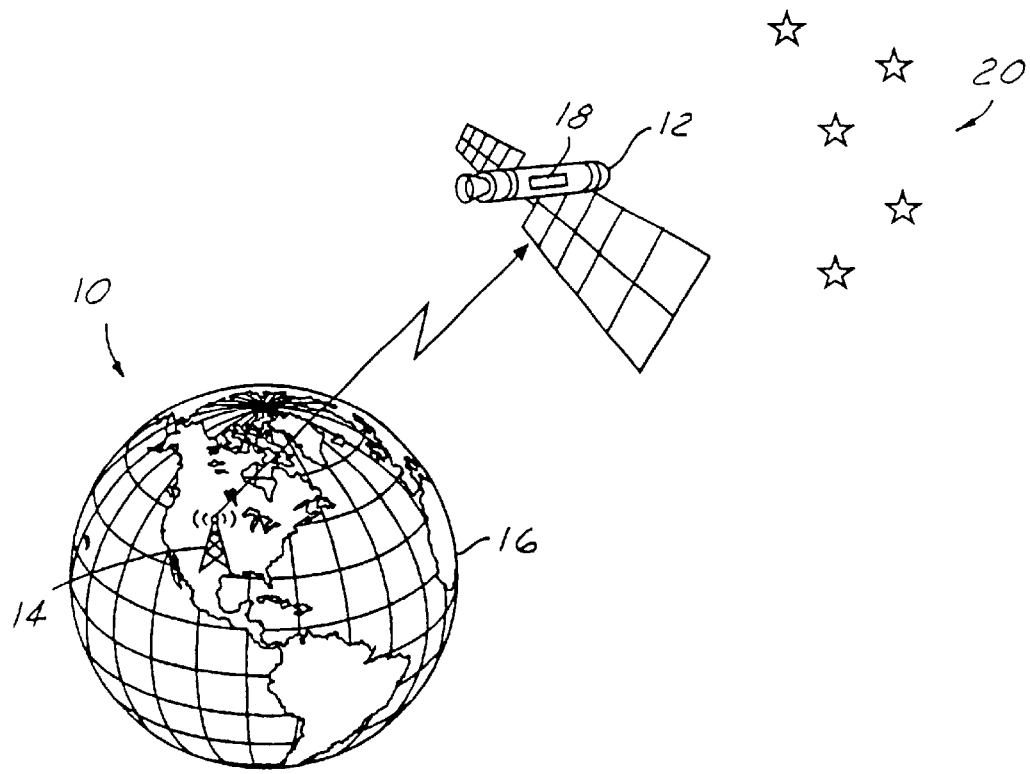
FIG. 1 is a perspective view of a satellite system for determining stars in a star tracker field of view in accordance with the preferred embodiment of the present invention.

Referring to FIG. 1, a perspective view of a satellite system 10 for determining stars in a star tracker field of view (FOV) in accordance with one embodiment of the present invention is illustrated. The satellite system 10 is comprised of one or more satellites 12 in communication with a ground station 14 located on the Earth 16. Each satellite includes an apparatus 18 for determining stellar inertial attitude based upon a plurality of stars 20.

The satellite system 10 is responsible for locating stars 20 within or near a star tracker field of view in order to control the attitude of satellite 12. Many scientific and communications missions cannot be accurately fulfilled without consistently monitoring and controlling the spacecraft 3-axis attitude. In many applications the satellite must be positioned to direct communication signals in particular directions or to receive signals from specifically located sources. Without accurate control over spacecraft 3-axis attitude, the transmission of such signals is hindered and at times impossible.

Figure 2:
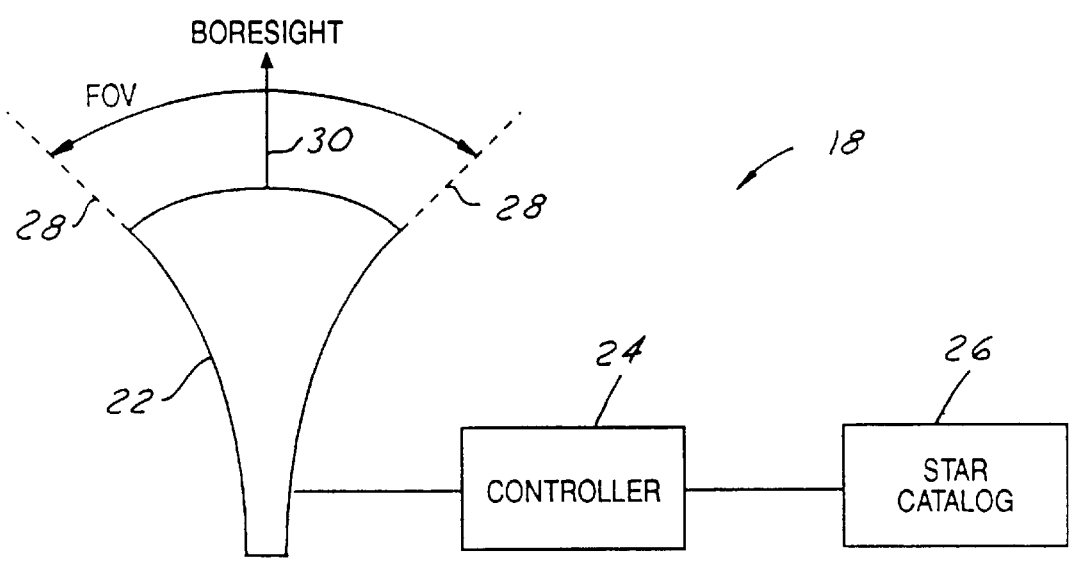
FIG. 2 is a block diagram of an apparatus for determining stars in a star tracker field of view in accordance with the preferred embodiment of the present invention.

Referring to FIG. 2, a block diagram of an apparatus 18 for determining stars 20 within or near a star tracker field of view 28 in accordance with one embodiment of the present invention is illustrated. Apparatus 18 includes a star tracker 22 and a controller 24. Apparatus 18 also includes a star catalog 26.

Star tracker 22 is mounted to the satellite 12 and is coupled to star tracker controller 24 in a conventional manner. Star tracker 22 includes a field of view (FOV) 28 and a boresight 30 centered in the FOV 28. Star tracker 22 is used to sense a plurality of positions of a plurality of stars 20 relative to star tracker 22. Star tracker 22 then generates a plurality of signals corresponding to the plurality of star positions in the FOV 28.

Star tracker controller 24 may reside either in satellite 12 or with ground station 14. Controller 24 is coupled to star tracker 22 and receives the plurality of signals corresponding to the plurality of star positions in the FOV 28. Star tracker controller 24 provides control logic operative to select at least two of the plurality of signals corresponding to the positions of at least two stars. Controller 24 uses star catalog 26 to determine which stars 20 to select. Controller 24 is preferably microprocessor based.

Star catalog 26 consists of a plurality of star right ascension and declination angles in a given earth centered inertial (ECI) frame, star instrument magnitude, and other star properties. Star catalog 26 contains data that is stored using primary and multiple secondary arrays sorted by both declination (DEC) and right ascension (RA). The primary array contains a list that represents declination angles ranging from negative ninety to positive ninety degrees, with a resolution of a declination step size. The ideal declination step size will vary depending on controller 24 throughput, tracker FOV 28 size and star catalog 26 size. It is also possible to use variable declination step sizes so that all secondary arrays are the same length. In the present preferred embodiments, the declination step size is defined to be one degree.

Each primary array element points to separate secondary arrays,, which contain star data (i.e. magnitude, star vector, and identification number) for all stars 20 that are between the current and the primary array next element. All the stars 20 in these secondary arrays are sorted by their right ascension from zero to 360 degrees.

Figure 3:
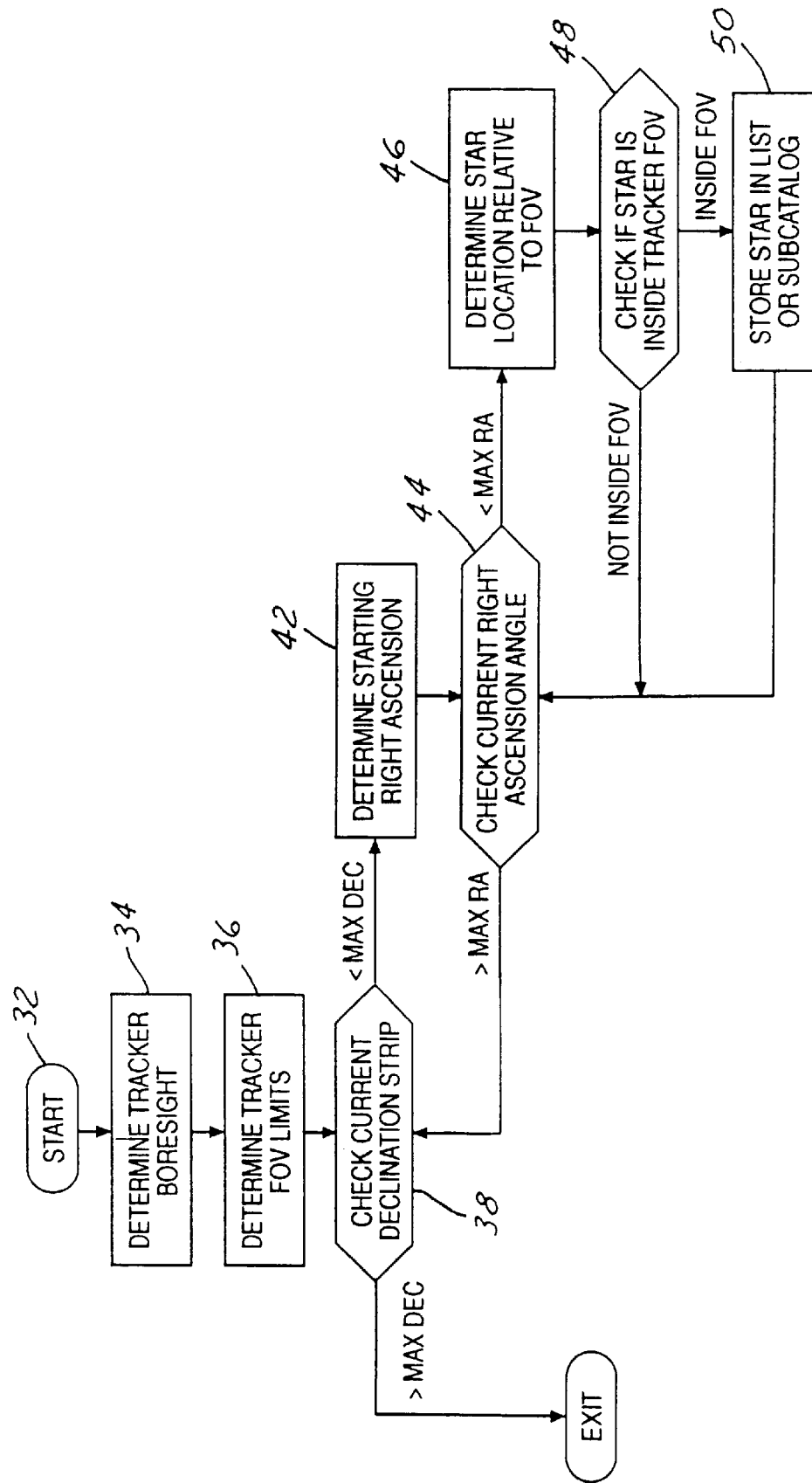
FIG. 3 is a flow chart of a method for determining stars in a star tracker field of view in accordance with the preferred embodiment of the present invention.

Referring to FIG. 3, a flow chart of a method for determining stars 20 within or near a field of view 28 in accordance with the preferred embodiment of the present invention is illustrated. The method for determining stars 20 within or near a field of view 28 uses star catalog 26 to locate all stars 20 in FOV 28. In order to find a set of stars 20, the minimum possible declination angle for the FOV 28 is calculated from the estimated attitude of satellite 12. Starting from the declination strip (secondary array) containing the minimum declination angle, a binary search is performed to find the minimum possible right ascension for FOV 28. Until the maximum right ascension is reached, each star is tested on whether it is in FOV 28. This method is then repeated until all possible declination strips have been searched.

The method for determining stars 20 within or near a field of view 28 can be used for several applications. One application involves star identification; in order to identify stars onboard satellite 12, the stars 20 within FOV 28 must be determined to perform direct matches against stars that are being tracked by star trackers 22. Another application involves direct FOV operation; controller 24 needs to command the star tracker to track desired stars within FOV 28. To do this, there must be knowledge of what stars 20 are located within FOV 28, and their location relative to FOV 28.

The present invention may also be used by a Confused in Space Stellar Attitude Algorithm (CISSAA). To use the CISSAA algorithm effectively onboard satellite 12, the present invention is used to locate all stars that may be within FOV 28 given some amount of uncertainty. This allows the CISSAA to rapidly locate stars 20 and star pairs near FOV 28. Additionally, the present invention can be applied to simulations. Star tracker models that are used in simulations must first identify all the stars in FOV 28.

In operation the method starts with step 32 and immediately proceeds to step 34. In step 34, the location of boresight 30 is determined in coordinates of right ascension (RA) and declination (DEC). Depending on how the present invention is being used, this will be done by (1) using a spacecraft estimated attitude, or (2) using the true attitude in a simulation. The result is a declination angle between negative ninety and positive ninety degrees, and a right hand ascension angle between zero and 360 degrees. The sequence then proceeds to step 36.

In step 36, the limits of FOV 28 are determined. While star tracker 22 may have any shape FOV 28, a square FOV 28 will be described in this example. Since a square FOV 28 may be rotated at any angle, an estimate must be made to determine the FOV 28 absolute maximum and minimum DEC and RA angles. To find these angles, the maximum possible delta angles are calculated, then added and subtracted from the boresight 30 coordinates. For the DEC, the maximum delta angle is along the diagonal of a square FOV 28. For the RA, the maximum angle will depend on the declination angle. The maximum RA angle is calculated by taking the maximum angle along the diagonal and dividing it by the cosine of the DEC. As the declination angle approaches positive or negative ninety degrees, the delta RA will become 360 degrees, and the minimum and maximum RA will become 0 and 360 degrees, respectively. When the present invention is used in a CISSAA, the attitude knowledge is not known precisely, and additional uncertainty error is added to the delta angles. Using the method of the present invention in this manner will quickly identify all stars that are within the uncertainty error of FOV 28. The sequence then proceeds to step 38.

In step 38, the current declination strip is checked. The minimum declination angle is used to determine the starting index into the primary array. Using this index, the assigned secondary array (also known as declination strip) is obtained. Each time the present invention returns to this step the next declination strip is obtained from the primary array. Once the maximum declination angle has been reached, there are no more stars 20 in FOV 28 and the sequence proceeds to step 40 and the process is finished. If the maximum declination angle has not been reached, the sequence then continues and proceeds to step 42.

In step 42, the starting right ascension is determined. For each declination strip, the starting right ascension is determined by performing a binary search on the selected secondary array using the minimum right ascension that was found in step 36. Since the declination strip is already sorted, the binary search finds the star element that is closest to, but greater than or equal to, the minimum right ascension. The sequence then proceeds to step 44.

In step 44, the current right ascension angle is checked. During each pass through this step, the current star element's right ascension is checked against the maximum. Once it becomes greater than the maximum, the sequence proceeds to step 38, where a new declination strip is obtained. For each star element that is found within the limits, the sequence proceeds to step 46.

In step 46, the star location relative to FOV 28 is determined. Referring to step 36, the minimum and maximum angles found define a rough boundary to FOV 28. In order to find whether a star is located inside FOV 28, the star coordinates in DEC and RA must be transformed to star tracker 22 coordinate frame in terms of horizontal (H) and vertical (V) components. The sequence then proceeds to step 48.

In step 48, the star coordinates are checked to determine if the star falls within FOV 28. To determine whether a star is inside FOV 28, the H and V components from step 46 are compared to the FOV limits. In one aspect of the present invention, star tracker 22 has a limit of plus or minus four degrees. If the star is not located in FOV 28, then the next element from the declination strip is found and the sequence continues back to step 44. If any stars have H and V components within plus or minus four degrees they are in FOV 28 and the sequence proceeds to step 50.

In step 50, the star found in FOV 28 is stored in a list or sub-catalog. Once the star is determined to be in FOV 28, it is stored, and the next element from the declination strip is found and the sequence proceeds back to step 44.

From the foregoing, it can be seen that there has been brought to the art a new and improved system for determining stars within or near a star tracker field of view. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims:

What is claimed is:

1. An apparatus for determining star location comprising:
   a star tracker for sensing a plurality of positions of a first plurality of stars relative to said star tracker, said star tracker having a field of view and generating a plurality of signals corresponding to said plurality of positions in said field of view, said field of view having a boresight;
   a star catalog comprising a primary array having a plurality of steps with a resolution of a declination step size, each step corresponding to a secondary array containing a plurality of declination angles and right ascension angles corresponding to a plurality of positions of a second plurality of stars; and
   a controller coupled to said star catalog and said star tracker, said controller having control logic operative to determine a location of said boresight, determine a limit to said field of view, check a current secondary array, determine a starting right ascension angle, check a current right ascension angle, determine a star location relative to said field of view, check if said star location is in said field of view, and store said star location in a sub-catalog.

2. The apparatus for determining star location as recited in claim 1, wherein said field of view is a shaped field of view.

3. The apparatus for determining star location as recited in claim 2, wherein said field of view is a square field of view.

4. The apparatus for determining star location as recited in claim 1, wherein said steps of said primary array are of variable size.

5. The apparatus for determining star location as recited in claim 4, wherein said variable size of said steps is adjusted to produce a plurality of second arrays having approximately the same size.

6. The apparatus for determining star location as recited in claim 1, wherein said steps of said primary array are of fixed size.

7. The apparatus for determining star location as recited in claim 6, wherein said fixed size of said steps is approximately one degree.

8. The apparatus for determining star location as recited in claim 1, wherein said field of view is limited to approximately plus and minus four degrees.

9. The apparatus for determining star location as recited in claim 1, wherein said apparatus is used by one of the applications selected from the group consisting of, star identification, direct field of view operation, confused in space stellar attitude algorithm, and simulation.

10. A satellite system comprising:
    a ground station;
    a satellite in orbit and in communication with said ground station, said satellite having an apparatus for determining star location comprising:
    a star tracker for sensing a plurality of positions of a first plurality of stars relative to said star tracker, said star tracker having a field of view and generating a plurality of signals corresponding to said plurality of positions in said field of view, said field of view having a boresight;
    a star catalog comprising a primary array having a plurality of steps with a resolution of a declination step size, each step corresponding to a secondary array containing a plurality of declination angles and right ascension angles corresponding to a plurality of positions of a second plurality of stars; and
    a controller coupled to said star catalog and said star tracker, said controller having control logic operative to determine a location of said boresight, determine a limit to said field of view, check a current secondary array, determine a starting right ascension angle, check a current right ascension angle, determine a star location relative to said field of view, check if said star location is in said field of view, and store said star location in a sub-catalog.

11. The satellite system for determining star location as recited in claim 10, wherein said field of view is a shaped field of view.

12. The satellite system for determining star location as recited in claim 11, wherein said field of view is a square field of view.

13. The satellite system for determining star location as recited in claim 10, wherein said steps of said primary array are of variable size.

14. The satellite system for determining star location as recited in claim 13, wherein said variable size of said steps is adjusted to produce a plurality of second arrays having approximately the same size.

15. The satellite system for determining star location as recited in claim 10, wherein said steps of said primary array are of fixed size.

16. The satellite system for determining star location as recited in claim 15, wherein said fixed size of said steps is approximately one degree.

17. The satellite system for determining star location as recited in claim 10, wherein said field of view is limited to approximately plus and minus four degrees.

18. The satellite system for determining star location as recited in claim 10, wherein said apparatus is used by one of the applications selected from the group consisting of, star identification, direct field of view operation, confused in space stellar attitude algorithm, and simulation.

19. A method of determining star location relative to a star tracker field of view comprising the steps of:
   determining a location of said boresight;
   determining a limit to said field of view;
   checking a current secondary array;
   determining a starting right ascension angle;
   checking a current right ascension angle;
   determining a star location relative to said field of view;
   checking if said star location is in said field of view; and
   storing said star location is a sub-catalog.

20. The method of determining star location relative to a star tracker field of view as recited in claim 19, wherein the step of determining a location of said boresight further comprising determining a location of said boresight using a spacecraft estimated attitude.

21. The method of determining star location relative to a star tracker field of view as recited in claim 19, wherein the step of determining a location of said boresight further comprising determining a location of said boresight using a true spacecraft attitude.

* * * * *